March 31, 1970 L. FROHLY 3,503,171
VESSEL PROVIDING RESISTANCE TO HIGH PRESSURES
Filed Feb. 5, 1968 5 Sheets-Sheet 1

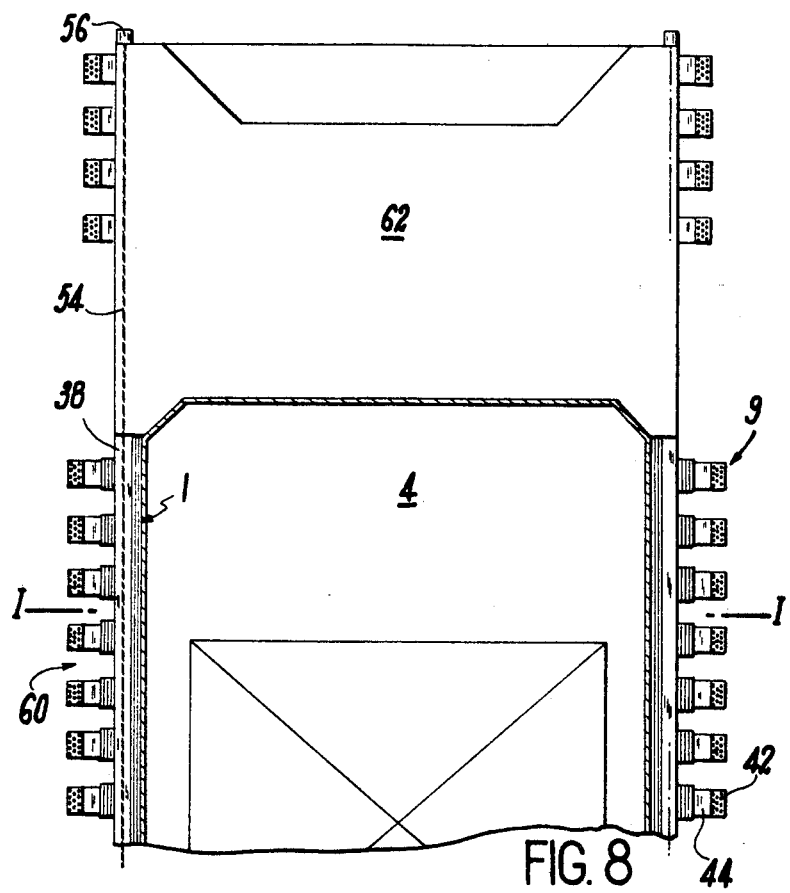
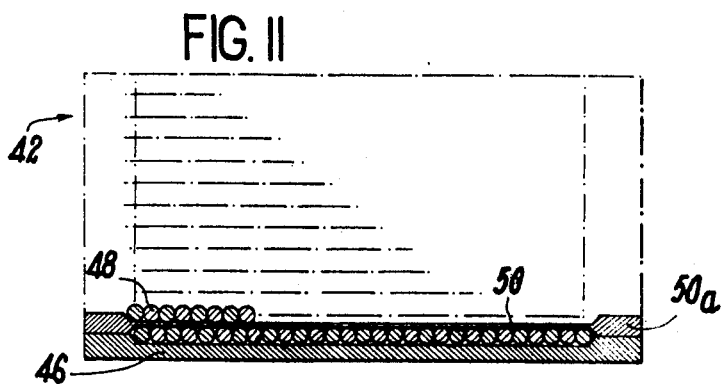

United States Patent Office 3,503,171
Patented Mar. 31, 1970

3,503,171
VESSEL PROVIDING RESISTANCE TO HIGH PRESSURES
Leon Frohly, Boulogne-Billancourt, Hauts-de-Seine, France, assignor to Commissariat a l'Energie Atomique and Compagnie Francaise d'Entreprises Metalliques
Filed Feb. 5, 1968, Ser. No. 703,087
Claims priority, application France, Feb. 10, 1967, 94,447
Int. Cl. E04c *2/34;* E04g *11/04*
U.S. Cl. 52—224         15 Claims

ABSTRACT OF THE DISCLOSURE

A vessel which is designed to withstand very high internal pressures and constituted by a cylinder in the form of a metallic structure which is prestressed transversely and longitudinally.

The metallic structure of the cylinder is a multilayer casing which is preferably strengthened by longitudinal beams between which longitudinal prestressing cables can be placed. The cylinder is maintained in compression by means of circumferential bands which provide transverse prestress.

The invention relates to vessels of the type comprising a lateral cylindrical wall having a relatively large internal diameter (in particular between 5 and 10 m.) and designed to withstand high internal pressures (especially of the order of 100 bars). Although many alternative applications may be contemplated, the pressure vessels with which this invention is primarily concerned are those which are designed to contain the core of a pressurized water reactor, whether of the boiling-water, non-boiling water, heavy water or light water type, and those which are intended to contain a liquid gas such as nitrogen or the like.

Vessels in which high pressures have to be maintained are being put to an increasingly large number of different uses at the present time and give rise in each case to major problems of construction. By reason of the very fact that such vessels are intended to contain fluids which are brought to very high temperatures and pressures and that the majority of such fluids are also of a hazardous nature, containment vessels must provide complete safety and leak-tightness, as well as high strength and a capacity for retaining their strength over long periods of service.

Vessels of large size are usually constructed of prestressed concrete owing to the difficulties involved in welding plates of the requisite thickness in the case of metallic vessels. However, the construction of concrete vessels gives rise to a large number of problems and entails high capital costs.

The present invention due to the work of Leon Frohly from Compagnie Française d'entreprises métalliques in the course of studies jointly made by this company and the Bureau d'Ingénieurs Conseils Coyne et Bellier, overcomes the drawbacks referred to by providing a vessel of composite structure which affords excellent resistance to high pressures and consequently achieves a very high standard of safety.

This invention is accordingly directed to a vessel which provides resistance to high pressures and essentially comprises a cylinder in the form of a metallic structure surrounded by transverse-prestressing bands having a compressive action which substantially compensates for the pressure exerted within the vessel, and two ends which close said cylinder.

According to another feature of the invention, the vessel cylinder comprises a cylindrical casing formed by superposed metal sheets of which the inner layer is strictly leak-tight, uniformly spaced longitudinal beams secured to said casing and bands for clamping the assembly consisting of beams and casing and for prestressing said casing.

Transverse prestressing subjects the cylinder structure to substantial compression when the vessel is at zero pressure. But as soon as the pressure rises within said vessel, the peripheral stress exerted on the structure decreases. During utilization of the vessel, the whole cylinder is therefore subjected in practice only to a small compressive stress inasmuch as only the bands are in tension. A longitudinal prestress applied in the same manner produces within the vessel in service a state of stress in two directions in the vicinity of zero, thus resulting in satisfactory structural resistance of the vessel at working pressure, even over an extremely long period of service. Moreover, the tension of the bands can readily be checked. It is also worthy of note that the leak-tight inner layer is continuously in compression, thereby reducing dangers of leakage.

By virtue of the high standard of safety thus achieved, the vessel is therefore wholly suited to the containment of any hazardous atmosphere of the type which is present, for example, in a nuclear reactor vessel.

Provision can also be made in at least one of the ends of the vessel for an opening of large size which is closed by means of a removable cover; the transverse section of said opening can be identical with that of the internal cylindrical face of the vessel.

In fact, according to another feature of the invention, the longitudinal beams are adapted to extend beyond the cylinder so as to fit between similar radial beams of a removable end in which the multilayer casing forms an extension of the cylinder casing.

Great ease of use can thus be added to operational safety of the vessel by virtue of the possibility of interior servicing.

Aside from the main arrangements mentioned above, the invention is also directed to a number of additional arrangements which are preferably employed at the same time and which will be discussed in greater detail hereinafter.

The invention is more especially concerned with one mode of application to vessels of the type containing a nuclear reactor core, with modes of execution of the arrangements aforesaid, and above all with the novel industrial products which are provided by vessels of the type referred to and which entail the application of the arrangements aforesaid, as well as the special elements designed for the construction of said vessels.

A clear understanding of the invention will in any case be gained from the complementary description which now follows as well as from the accompanying drawings, it being understood that said description and drawings are given solely by way of indication and relate to three embodiments which are illustrated respectively in FIGS. 1 to 5, 6 and 7, and 8 to 11.

In these drawings:

FIG. 8 is a partial diagrammatic view in longitudinal cross-section showing a third form of construction of a vessel which is designed to afford resistance to high pressures and which is fully prestressed (the multilayer cylinder being shown on an enlarged scale).

FIG. 11 is a view in transverse cross-section on an enlarged scale and showing a prestressing band.

In accordance with the invention, and more especially in accordance with a preferred application and mode of construction of a vessel having a cylindrical lateral wall of relatively large diameter (especially between 5 and 10 m.) which is capable of withstanding high internal pressures (especially of the order of 100 bars), the method of operation is carried out as described hereinafter.

Figure 1:
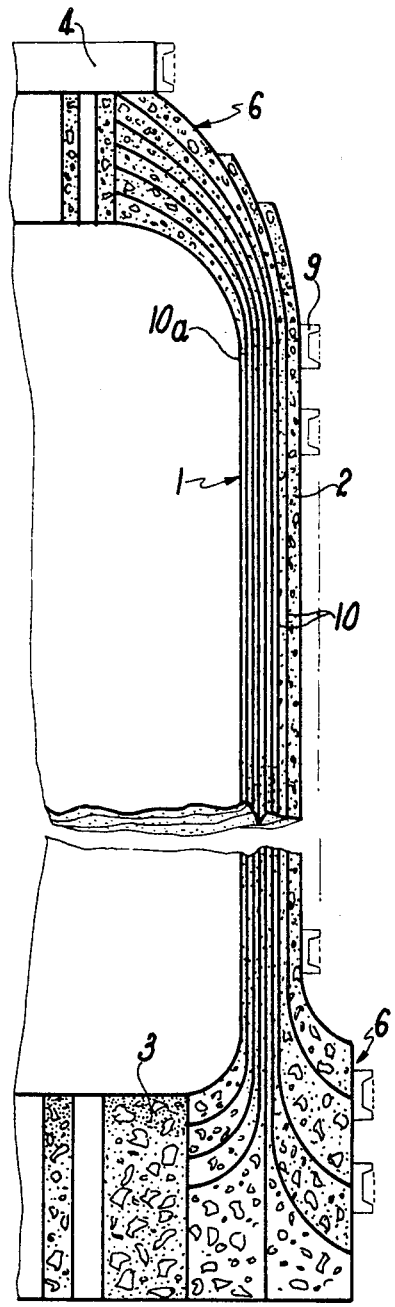
FIGS. 1 and 2 show diagrammatically the metallic wall of a vessel according to the invention as shown respectively and partially in vertical cross-section and in transverse cross-section on a larger scale.

The lateral wall of the vessel comprises an essentially metallic casing 1 (as shown in FIG. 1) of relatively small thickness and high strength to which an external prestress is applied. The prestress is preferably applied in addition to the edge rings of the lower section 3 and upper section 4 of the vessel and is directed transversely to the axis of the vessel which is assumed to be vertical for the sake of example.

Said casing 1 is composed of superposed steel sheets 10 which are suitably assembled, for example by welding. Said sheets 10 thus form successive layers which are treated separately and provide intermediate spaces in which is introduced at least one substance which forms as effective a bond as possible and in any case a perfectly determined bond, with the result that the operating conditions of the assembly can be calculated with accuracy.

A number of different methods of assembly may be contemplated. For example, the casing can be constructed as shown in FIGS. 1 to 3, by making use of a filler material and preferably a compact binding agent such as concrete (or any other powdered material, thermosetting plastic material and the like), in particular concrete or mortar which is injected under pressure, and if necessary in combination with reinforcements which may be provided in the concrete, at least at certain points; as shown diagrammatically in FIGS. 4 and 5, by interposing between the layers an intermediate layer which has a certain elasticity such as, for example, a layer of plastic material, deformable metallic tubes and so forth; by employing the above-mentioned expedients in combination.

Figure 2:
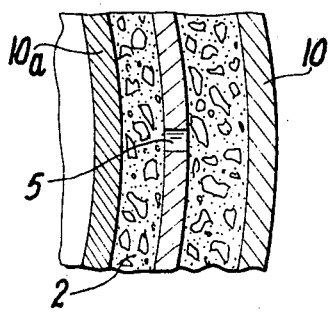
Figure 3:
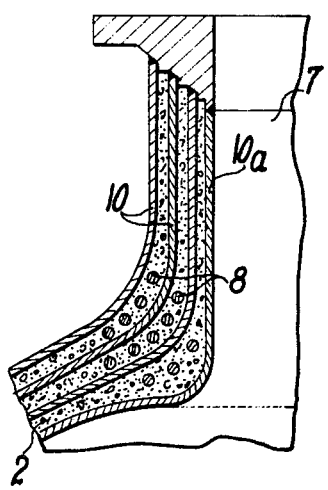
FIG. 3 is a partial view of a portion of a wall of this type in the vicinity of an opening.

In FIGS. 1 and 2, there is in fact shown a casing 1 which consists of superposed steel sheets 10 separated by spaces which can be filled, for example, with concrete or motar 2.

If so required, holes 5 can be provided in the steel sheets 10 other than the internal wall 10a of the vessel in order to provide a means of controlling the penetration of the material such as mortar or concrete (as shown in FIG. 2).

The practical utilization of said filler material is suited to each particular case and the spacing between steel sheets is chosen in order to permit homogeneous filling and transmission of stresses from one layer to the adjacent layer.

Consideration being given by way of example to a vessel which carries an internal pressure of 90 bars and has a diameter of 9 meters, the wall of such an enclosure could be formed by 15 successive steel/concrete layers, the unitary steel sheets being, for example, 30 mm. in thickness and the spaces chosen accordingly, for example between 30 and 50 mm.

At the points of junction, that is to say in the transition zones 6, with the lower section 3 or upper section 4 of the vessel, provision can be made for a progressive outward displacement of the steel sheets in such a manner as to establish the junction under the best conditions while tending to subject the metal sheets 10 to longitudinal stresses under load. Furthermore, said outward displacement of the sheet ends will make it possible to facilitate the junction between the concrete of the spaces 2 and said sections 3 and 4.

A similar arrangement, namely the progressive flaring-out or widening of the metal sheets 10 and of the spaces 2 can be adopted each time it proves necessary to form any connection, as is also shown in FIG. 3 in reference to an opening 7. It is apparent that the sheets 10 are flared around said opening in the direction of local stresses. Reinforcements 8 may be provided to complete the assembly in order to ensure good resistance to peripheral stresses.

The design just mentioned permits of highly accurate construction of the casing inasmuch as the different layers are formed separately without thereby entailing the need to ensure internal contact between the layers or metal sheets, this last-mentioned function being performed by the filler material.

Checking operations can therefore be carried out with great ease and can be continued with each successive layer under conditions which are similar to those of the initial layer.

Said casing can readily be combined with means for providing either cooling or heating between layers.

Bands 9 of prestressed concrete or of tensioned cables which are placed around said casing 1 (as shown in FIG. 1) exert a prestress which may be superimposed on the partial prestress already provided by means of the arrangements mentioned above and consisting of injection under pressure.

When the vessel thus constructed is at zero internal pressure, the composite wall in accordance with the invention is compressed by the bands 9. Compressive stresses tend to decrease to zero as soon as pressure is developed within the vessel and this latter is then subjected to tension under load in the normal manner. However, in any prestressed concrete structure which is not provided with metal sheets, the usual limitation imposed by a compressive stress which is always positive on the internal face does not exit in the novel structure under consideration.

In any case, the existence of the transverse stress referred-to makes it possible to reduce to an appreciable extent either the thickness of the number of metal sheets 10.

Figure 4:
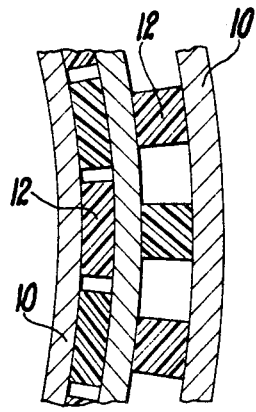
FIGS. 4 and 5 illustrate in partial horizontal cross-section alternative forms of construction of the multilayer wall of the vessel.
Figure 5:
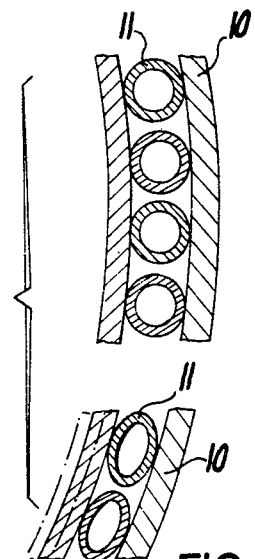

According to an alternative embodiment shown in FIGS. 4 and 5, provision is made within the spaces between the sheets 10 for materials which are endowed with elastic properties.

Transmission of pressures is again ensured in this embodiment while maintaining relative independence of the metallic layers 10. However, by additionally introducing a material which is endowed with elasticity in at least the first layer 10 as a replacement for the concrete, the thermal stresses which arise from the incompressibility of the concrete can be reduced to a substantial extent within an enclosure which is under pressure and subjected to high temperature.

The use of the above-mentioned elastic materials therefore makes it possible to increase the overall thermal gradient within a casing which is formed of a number of layers; only the thermal stresses which arise from the temperature gradient in the steel sheets remain unchanged but nevertheless remain of a low order by reason of the thermal conductivity of the steel.

In the case of utilization at temperatures which are considerably higher than ambient temperature, the elastic material can be constituted by hollow steel sections, tubes, corrugated sections which provide the requisite degree of elasticity over a given range of loads. The application of the vessel accordingly extends to pressure reservoirs and tanks at all operating temperatures.

FIG. 4 shows a casing which is made up of steel sheets 10 separated by layers 12 of neoprene or any other synthetic rubber for operation within relatively small temperature ranges.

In addition, FIG. 5 shows a casing which is fitted with steel tubes 11 for utilization with higher thermal gradients, and in which said tubes 11 may serve as cooling ducts. The connection between steel sheets 10 is provided by virtue of the elasticity of the tubes 11 which are subjected to compression along their diameter. The lower portion of FIG. 5 illustrates the elastic deformation of said tubes 11 under the action of the pressures applied.

In another embodiment of the vessel, the prestressing bands 9 are not applied directly against the multilayer casing 1 but against longitudinal beams 13 disposed radially around said casing and ensure cohesion between said beams.

Figure 6:
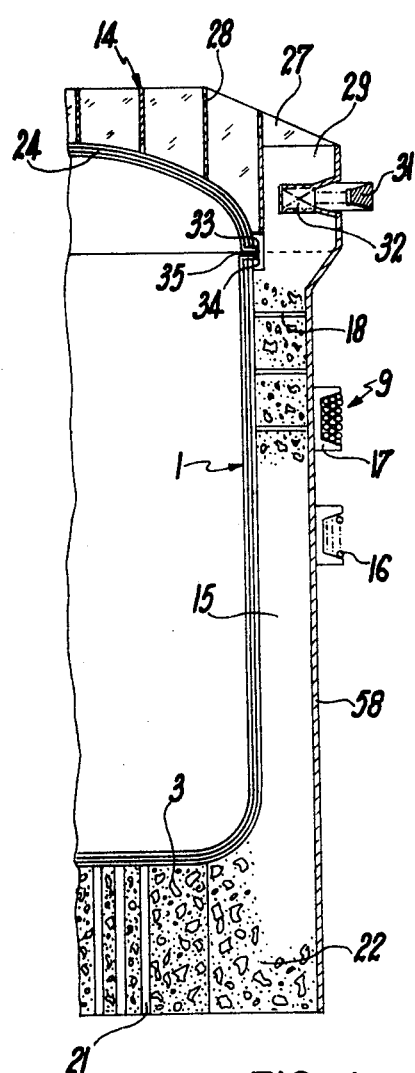
FIG. 6 shows in half-axial cross-section an alternative form of construction of a vessel in accordance with the invention.
Figure 7:
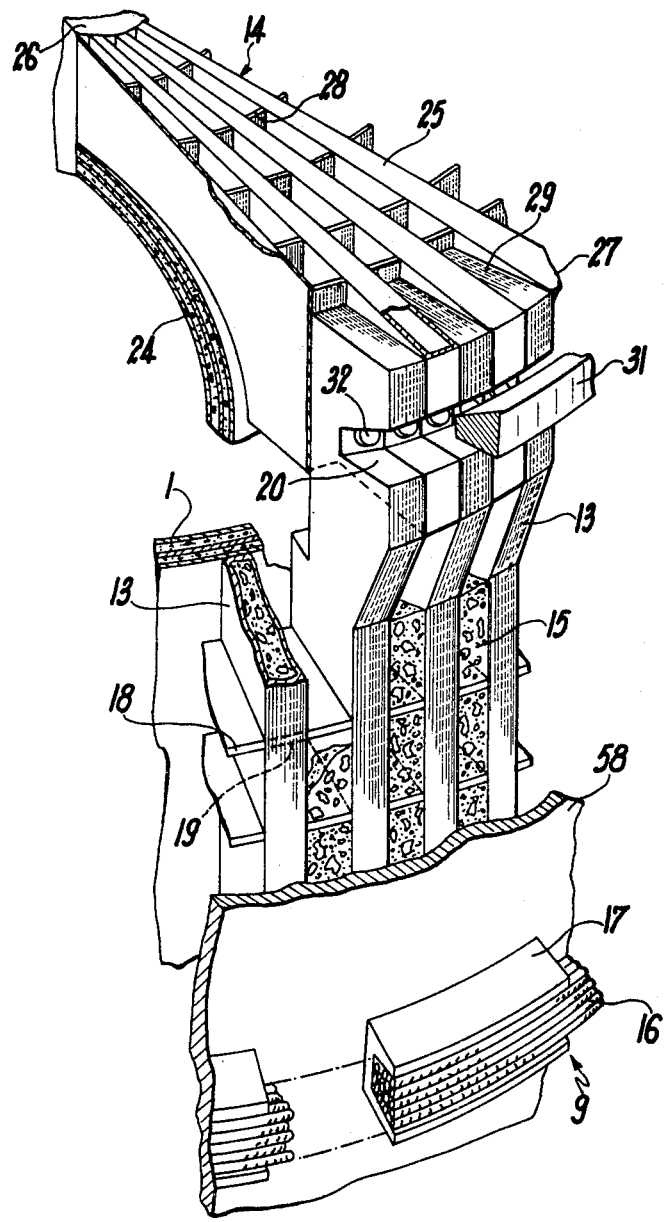
FIG. 7 is a partial view of the vessel of FIG. 6, as shown in perspective with portions broken away.

In the exemplified embodiment which is shown in FIGS. 6 and 7, said beams are of the "box" type or, in other words, consist of metallic casings having a cross-section which is preferably in the shape of an elongated right-angled parallelepiped, and are disposed radially in the from of longitudinal ribs around the casing 1. There are formed between said beams spaces 15 which can serve to accommodate longitudinal prestressing cables (not shown).

The bands 9 are formed either of prestressed concrete or else are composed of tensioned cables 16 which are applied circumferentially against the beams 13 by means of shoes 17; the compressive stress induced by the banding is transmitted by means of said box beams to the internal casing 1 which is thus subjected to prestress, thereby enhancing its resistance to the pressure which is maintained within the vessel in respect of a given thickness.

Cohesion of the wall of the vessel cylinder can also be ensured by means of an additional outer casing 58 which is formed in the same manner as the inner casing 1 and mounted around the box beams 13.

It can also be of interest to brace the beams 13 by means of welded-plate spacer members 18, as shown in FIGS. 6 and 7. In order to form continuous stiffening hoops in conjunction with said spacer members 18, it is an advantage in addition to make provision inside the box beams for internal ribs 19 (as shown in FIG. 7) which are located at the level of said spacer members.

In some cases, it can be useful to fill with concrete the spaces 15 between the box beams 13 whilst the beams themselves can also be filled with concrete. The concrete can be ordinary concrete which is placed by injection and prevents buckling of the beams while also affording biological protection of personnel located outside the vessel. An additional function of the concrete is to transmit pressure forces.

The ends 3 and 4 of the vessel can be constructed in any desirable manner.

In the embodiment which is illustrated in FIGS. 6 and 7, the axis of the cylinder is vertical and the base is constituted by a slab 3 in which are formed a large number of vertical ducts 21 and which is welded at its periphery to lower horizontal extensions 22 or abutment shoulders of the vertical box beams 13.

The upper portion of the vessel is closed by a removable cover 14.

In this embodiment, said cover is composed of a lower dome 24 which is constituted in the same manner as the casing 1 by welded steel sheets in superposed relation, and a crown of box beams 25 which are welded onto said dome, said box beams being adapted to extend radially from a common central member 26 (as shown in FIG. 7) to peripheral extremities 27 and being braced by sheet metal members 28.

Said extremities 27 are designed in such a manner as to fit exactly between the upper extremities 29 of the vertical box beams 13, that is to say in the top zones of the spaces 15, no concrete having been placed in said top zones for this specific purpose.

When the extremities 27 are fitted between the extremities 29, all of said extremities being hollowed-out externally so as to form recesses 20, these recesses are located in circumferential alignment in such a manner as to form an annular groove.

The box beam extremities which are thus in interengaged relation are locked in this position by means of shear-resistant keys 31 which are inserted laterally in said groove, preferably under the action of jacks 32 which are mounted in the extremities 29 of the stationary vertical beams.

At the time of interengagement, flanges 33 and 34 of the cylindrical casing 1 and of the domical end 24 are clamped against each other in the vertical direction so as to flatten by compression between said flanges either one of a number of seals 35 (as shown in FIG. 6).

A large-diameter vessel of this type is thus capable of affording resistance to high internal pressures while remaining accessible over the entire width of its cylindrical portion, thereby providing considerable advantages in regard to erection, maintenance and repair work on vessel internals.

Figure 9:
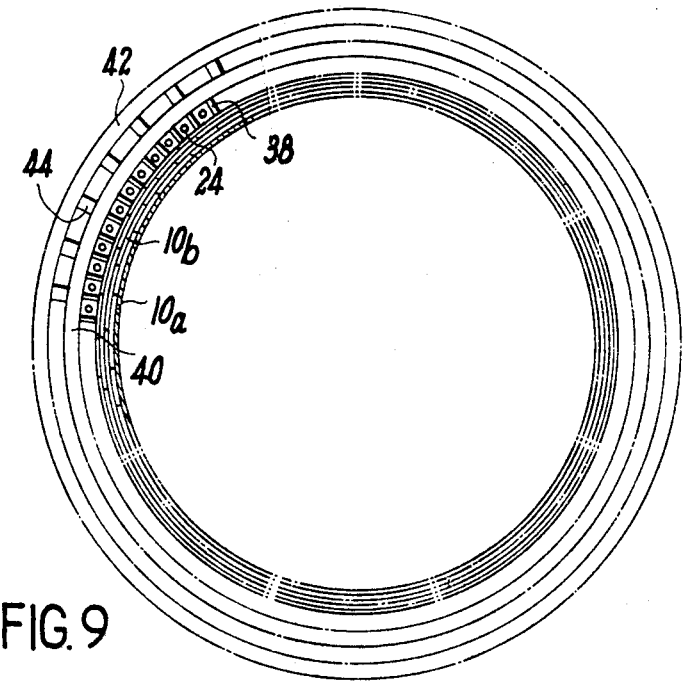
FIG. 9 is a view in cross-section taken along the line I—I of FIG. 8.
Figure 10:
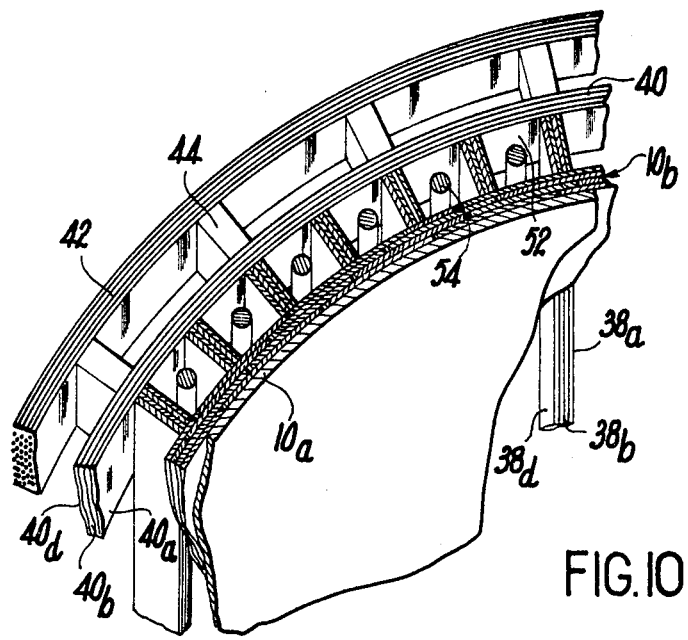
FIG. 10 is a detail view on a larger scale showing a portion of FIG. 9.

FIGS. 8 to 11 show another form of construction of said vessel, wherein the cylindrical shell consists of a multilayer casing 1 which comprises (as shown in FIGS. 9 and 10) an inner sheet metal lining 10a which forms a strictly leak-tight wall and against which are applied successive layers 10b, said layers being four in number, for example.

Longitudinal beams 38 are secured radially to the casing 1 at uniform intervals over the entire circumference of the vessel. Each beam 38 is made up of a plurality of metallic strips 38a, 38b which are applied against each other and secured to the cylinder 1. The complete assembly of said beams and said casing is surrounded by metallic rings 40 which are uniformly spaced over the entire length of the vessel.

In the exemplified embodiment shown, the longitudinal beams 38 are disposed outside the casing 1 and the rings 40 are applied against the beams. However, it is apparent that the beams could be mounted inside the casing 1, in which case the rings are applied against said casing. Said rings 40 consist of a plurality of annular metal sheets (40a, 40b) which are applied against each other, the inner sheet 40a being in contact with or even secured to each of the beams 38.

Each ring 40 serves as a support for a transverse prestressing band 42 which is adapted to clamp by means of tensioning blocks 44 the entire metallic structure of the cylinder 60, that is to say the rings 40, the longitudinal beams 38 and the casing. This structure is thus subjected to a compression which, when the metal employed is steel, can be of a high value of the order of 20 kgs./mm.$^2$, for example.

The prestressing bands 42 can be fabricated in any suitable manner. For example, as shown in FIG. 11, the bands referred-to can consist of an annular metal sheet 46 or shoe of substantial thickness around which are wound steel wires 48. Said wires form a predetermined number of layers separated by thin metal sheets 50, the edges 50a of which are thickened and fixed to each other. Each prestressing band 42 is tensioned by means of jacks which are applied on the one hand against the corresponding ring 40 and on the other hand against the band 42. Under the action of the stress which is thus exerted, the wires 48 are embedded in the sheet metal members 50 and thus secured in position whilst said sheet metal members 50 are consequently deformed to a slight extent. When the requisite tension is attained or, in other words, when the stress within the cylinder 60 corresponds to the action of a pressure within the vessel which is slightly higher than the pressure which should normally exist therein, the tensioning blocks 44 are inserted and the jacks withdrawn.

In the exemplified embodiment which is illustrated and only the upper half of which is shown in FIG. 10 since the lower half is of wholly similar design, the vessel comprises a barrel or cylinder 60 which forms a metallic structure and against which are applied two ends or bases 62 which also form a metallic structure but which can also be formed of concrete or any suitable material of similar type. The vessel ends may, for example, be formed in the same manner as the cylinder wall and be restrained by longitudinal cables as described in reference to FIGS. 8 to 11.

In this case, longitudinal cables 54 are placed between the beams 38 within the recesses 52 which are formed by said beams and the casing 1. Each cable 54 is passed through the two vessel ends 62 and terminates externally of these latter in heads 56 which serve to adjust the tension. Said cables 54 apply said vessel ends 62 against the beams 38 and the casing 1 and exert on these latter a longitudinal prestress which is substantially balanced during operation of the vessel by the thrust induced by the pressure which is developed within the vessel.

At zero internal pressure, the vessel structure as a whole is therefore subjected to high compressive stresses which can come close to the ultimate strength of the metal without any attendant danger; but, as soon as the pression within the vessel increases, said stresses decrease until they finally attain a low value during normal operation. Fatigue of the structure during such operation is therefore practically zero. In the event of pressure overload within the vessel, the structure would therefore be capable of withstanding the resultant stress. The only components which are continuously under stress are the longitudinal cables and the transverse prestressing bands. However, said bands are located entirely outside the vessel and can therefore be readily checked, monitored, maintained and even replaced.

In consequence of the foregoing, the vessel affords a very high degree of safety in operation and is therefore particularly well suited to the construction of nuclear reactors, in which it is extremely important to ensure that containment of the reactor core is provided by a vessel which is endowed with excellent resistance to pressure. In an application of this type, a biological shield can be mounted around the cylinder structure and if necessary around the end structures in order to prevent the propagation of radioactive radiation within surrounding premises.

Furthermore, the vessel is of small overall size by reason of the fact that, as a result of prestressing, the stresses to which the vessel wall is subjected are low in value and the thickness of the metal sheets can also be small. Moreover, the vessel remains simple to construct since none of the components of the structure calls for highly accurate machining.

As is readily understood, and as has in any case been brought out by the foregoing, the invention is not limited in any sense to the modes of application or to the forms of construction of its various parts which have been more especially contemplated herein but extends on the contrary, to all alternative forms.

What we claim is:

1. A high pressure resisting vessel comprising a plurality in excess of two superposed metallic layers forming a cylinder, ends for said cylinder, a plurality of transverse prestressing bands surrounding said cylinder and placing said cylinder in compression and longitudinal prestressing members extending between said layers and said ends, the inner one of said metallic layers being fluid tight.

2. A vessel as described in claim 1, said longitudinal prestressing members being cables.

3. A vessel as described in claim 1, said layers being spaced from each other and including stress transmitting material between said layers.

4. A vessel in accordance with claim 1 said beams being disposed along radii of said cylinder.

5. A vessel in accordance with claim 1 including metallic rings maintained on the circumference of said cylinder, said prestressing bands applying compression to said rings and blocks for maintaining tension between said bands and said rings.

6. A vessel in accordance with claim 5, said metallic rings comprising a plurality of assembled annular sheet metal members the inner one of said sheet metal members being in contact with said cylinder.

7. A vessel in accordance with claim 1, said bands including metallic shoes clamped by prestressing cables on said cylinder.

8. A vessel in accordance with claim 7, each of said bands comprising a superposed array of annular layers of wound wires separated by thin sheet metal members.

9. A vessel as described in claim 1 including a plurality of spaced longitudinal beams secured to the outer surface of said cylinder, said bands engaging said beams and further placing said cylinder in circumferential prestress.

10. A vessel in accordance with claim 9, said beams comprising a stack of parallel strips of sheet metal disposed along the radii of said cylinder, said metallic strips being fixed against each other and to said cylinder.

11. A vessel in accordance with claim 9 including at least one removable end, a multilayer dome and end beams fixed on said dome along radii of the cylinder forming said end, said radial end beams fitting between extensions of said longitudinal beams.

12. A vessel in accordance with claim 11, said radial beams of said end and said extensions of said longitudinal beams being each provided with an external recess and an arcuate key in said recesses locking said end to said cylinder.

13. A vessel in accordance with claim 9, said beams being elongated metallic boxes secured to said cylinder and flat rings at right angles to the axis of the vessel spacing said beams.

14. A vessel in accordance with claim 13, said box beams being filled with concrete and separated by a concrete filling.

15. A vessel in accordance with claim 14, said rings being extended within said box beams.

References Cited

UNITED STATES PATENTS

| | | | |
|---|---|---|---|
| 928,233 | 7/1909 | Langford | 138—175 |
| 1,210,716 | 1/1917 | Snow | 52—248 |
| 1,222,849 | 4/1917 | Coons | 52—247 |
| 1,804,888 | 5/1931 | Monsch | 138—176 |
| 2,558,580 | 6/1951 | Pomykala | 52—20 |
| 3,404,497 | 10/1968 | Burrow | 52—230 |

HENRY C. SUTHERLAND, Primary Examiner

JAMES L. RIDGILL, JR., Assistant Examiner

U.S. Cl. X.R.

52—24, 248, 249; 138—175; 220—3